United States Patent
Russell et al.

(10) Patent No.: US 12,252,406 B2
(45) Date of Patent: Mar. 18, 2025

(54) APPARATUSES AND PROCESSES FOR THE RECOVERY OF CARBON DIOXIDE STREAMS

(71) Applicant: UOP LLC, Des Plaines, IL (US)

(72) Inventors: Bradley Russell, Carol Stream, IL (US); Kyle Cuellar, Fulshear, TX (US); Eleftherios Adamopoulos, Gurnee, IL (US); Mark Schott, Palatine, IL (US); Bhargav Sharma, Katy, TX (US)

(73) Assignee: UOP LLC, Des Plaines, IL (US)

( * ) Notice: Subject to any disclaimer, the term of this patent is extended or adjusted under 35 U.S.C. 154(b) by 474 days.

(21) Appl. No.: 17/451,983

(22) Filed: Oct. 22, 2021

(65) Prior Publication Data

US 2023/0082135 A1    Mar. 16, 2023

Related U.S. Application Data

(60) Provisional application No. 63/241,681, filed on Sep. 8, 2021.

(51) Int. Cl.
*F25J 3/02* (2006.01)
*B01D 53/047* (2006.01)
(Continued)

(52) U.S. Cl.
CPC ............ *C01B 32/50* (2017.08); *B01D 53/047* (2013.01); *B01D 53/1418* (2013.01);
(Continued)

(58) Field of Classification Search
CPC .. C01B 32/50; B01D 53/047; B01D 53/1418; B01D 53/1431; B01D 53/1487;
(Continued)

(56) References Cited

U.S. PATENT DOCUMENTS

| 4,772,420 A | 9/1988 | Pinto et al. |
| 4,952,223 A | 8/1990 | Kirshnamurthy et al. |

(Continued)

FOREIGN PATENT DOCUMENTS

| EP | 2141119 A1 | 1/2010 |
| WO | 2011067326 A1 | 6/2011 |
| WO | 2013119465 A1 | 8/2013 |

OTHER PUBLICATIONS

F. Patrick Ross et al., Economical Option for CO2/Methane Separation in Produced Gas Containing a High CO2 Fraction.
(Continued)

*Primary Examiner* — Miguel A Diaz

(57) ABSTRACT

Processes and apparatuses for recovering a high purity carbon dioxide stream. A first separation zone that may include a cryogenic fractionation column provides the high-purity $CO_2$ stream. A vapor stream from the cryogenic fractionation column is passed to a second separation zone to separate the $CO_2$ from the other components. The second separation zone may include a pressure swing adsorption unit or a solvent separation unit. The second separation zone provides a hydrogen enriched gas stream that may be used in a gas turbine. The second stream from the second separation zone includes carbon dioxide and, after a pressure increase in a compressor, may be recycled to the first separation zone.

17 Claims, 2 Drawing Sheets

Figure 1:
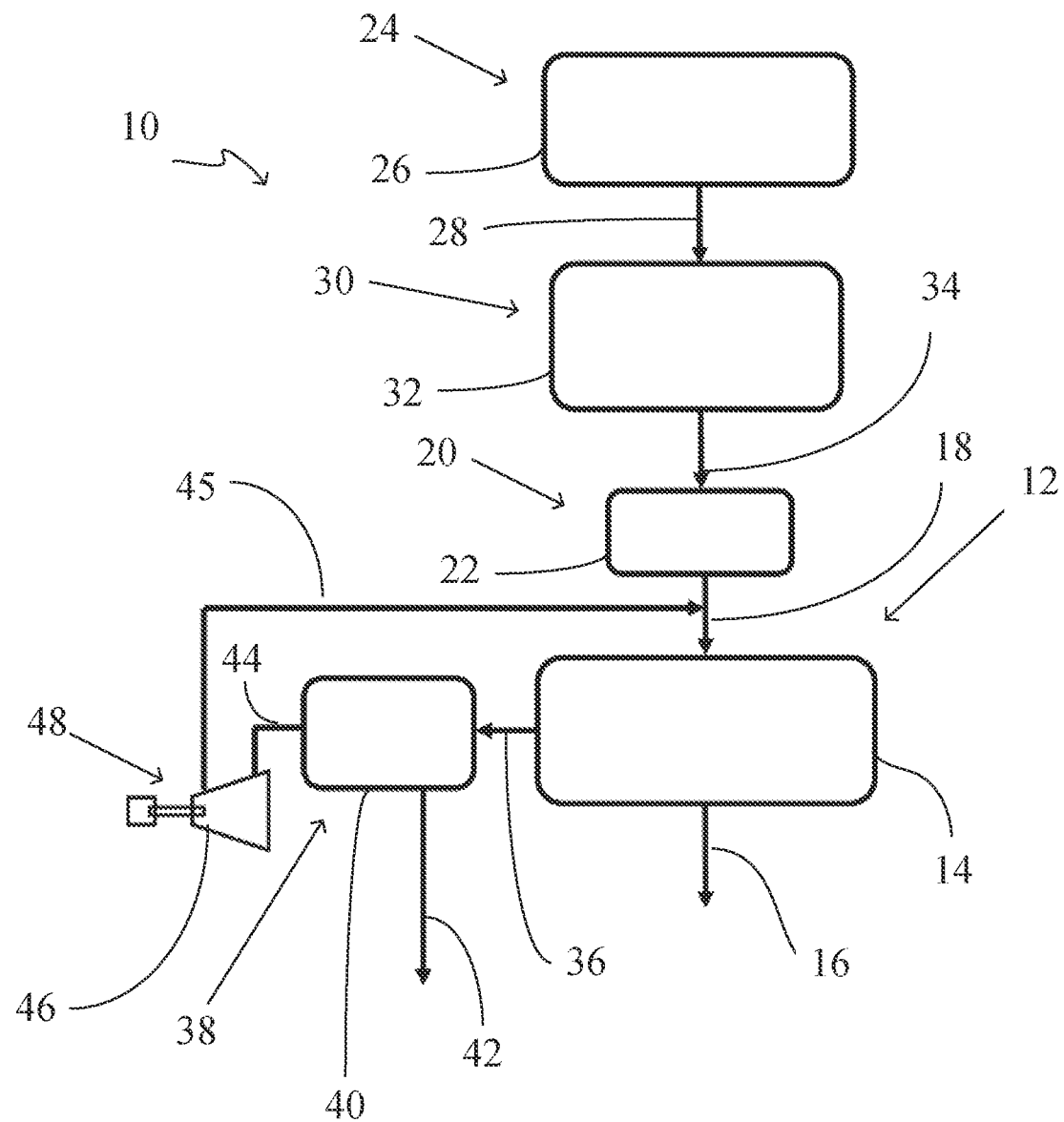

(51) Int. Cl.
*B01D 53/14* (2006.01)
*B01D 53/18* (2006.01)
*C01B 32/50* (2017.01)

(52) U.S. Cl.
CPC ..... *B01D 53/1431* (2013.01); *B01D 53/1487* (2013.01); *B01D 53/18* (2013.01); *F25J 3/0223* (2013.01); *F25J 3/0266* (2013.01); *B01D 2256/22* (2013.01); *B01D 2257/102* (2013.01); *B01D 2257/104* (2013.01); *B01D 2257/108* (2013.01); *B01D 2257/11* (2013.01); *B01D 2257/502* (2013.01); *B01D 2257/7025* (2013.01); *F25J 2205/40* (2013.01); *F25J 2205/50* (2013.01); *F25J 2205/64* (2013.01); *F25J 2215/80* (2013.01); *F25J 2220/80* (2013.01); *F25J 2245/02* (2013.01); *F25J 2290/12* (2013.01)

(58) Field of Classification Search
CPC ................ B01D 53/18; B01D 2256/22; B01D 2257/102; B01D 2257/104; B01D 2257/108; B01D 2257/11; B01D 2257/502; B01D 2257/7025; F25J 3/0223; F25J 3/0266; F25J 2205/40; F25J 2205/50; F25J 2205/64; F25J 2215/80; F25J 2220/80; F25J 2245/02; F25J 2290/12

See application file for complete search history.

(56) References Cited

U.S. PATENT DOCUMENTS

| | | | | |
|---|---|---|---|---|
| 7,165,423 | B2 * | 1/2007 | Winningham | ............ F17C 9/02 |
| | | | | 62/620 |
| 2010/0064725 | A1 * | 3/2010 | Chieng | ................ F25J 3/0238 |
| | | | | 62/620 |
| 2011/0088897 | A1 * | 4/2011 | Raman | .................... E21B 43/40 |
| | | | | 166/267 |
| 2015/0210936 | A1 | 7/2015 | Burgers et al. | |
| 2015/0291438 | A1 * | 10/2015 | Merritt | ................ B01D 53/002 |
| | | | | 423/352 |
| 2016/0250580 | A1 | 9/2016 | Monereau et al. | |
| 2019/0135626 | A1 | 5/2019 | Rafati et al. | |

OTHER PUBLICATIONS

International Search Report from corresponding PCT application No. PCT/IB2022/075834, mailed on Dec. 27, 2022.
Written Opinion from corresponding PCT application No. PCT/IB2022/075834, completed on Dec. 27, 2022.

* cited by examiner

APPARATUSES AND PROCESSES FOR THE RECOVERY OF CARBON DIOXIDE STREAMS

RELATED APPLICATIONS

This application claims priority to U.S. Provisional Patent Application No. 63/241,681, filed on Sep. 8, 2021, the entirety of which is incorporated herein by reference.

FIELD OF THE INVENTION

This invention relates generally to apparatuses and processes for the recovery of carbon dioxide streams, and more particularly to the recovery of high pressure and/or high purity carbon dioxide streams.

BACKGROUND OF THE INVENTION

Carbon dioxide ($CO_2$) products for transportation, often being sent to a sequestration site, are required to be either a high-pressure gas, for transport via a pipeline, or liquid, for transport via a ship transport, at relatively high purity (e.g., >95 mol % or higher). Moreover, stringent limits on specific impurities (e.g., carbon monoxide, sulfur components, etc.) are generally imposed on the carbon dioxide products.

For example, gasification processes using fossil-fuel based feedstocks (such as coal or petroleum coke) can be used to produce clean power and/or clean hydrogen. In such gasification processes, carbon dioxide from the process may be recovered and sequestered underground, while hydrogen and light hydrocarbons are supplied for various uses. Using renewable/biomass feedstocks (alone or in combination with fossil-fuel feedstocks) may further reduce the carbon footprint of gasification-based power or hydrogen production and may even lead to carbon negative power and hydrogen.

As noted above, the carbon dioxide produced by gasification is typically transported to a sequestration site. In light of the previously mentioned constraints on the carbon dioxide product for transport, current methods for carbon dioxide removal (such as physical solvents) from streams containing carbon dioxide, including effluent streams from a gasification unit, are not optimal.

Therefore, there remains a need for effective and efficient processes for producing high-purity carbon dioxide from certain carbon dioxide containing streams.

SUMMARY OF THE INVENTION

One or more processes and apparatuses have been invented which provide for the effective and efficient production of high-purity carbon dioxide. The present invention provides these solutions by using a carbon dioxide separation process.

For example, syngas from a water-gas shift reactor may be dried, chilled, and fractionated in a cryogenic carbon dioxide fractionation process with a distillation column to produce a high-purity carbon dioxide liquid bottoms product. The operating temperature of this column is limited by the carbon dioxide phase diagram (triple point at −57° C.). Therefore, a significant amount of carbon dioxide in the column overhead stream must be recovered. The overhead stream includes other components that are separated from the overhead stream before it may be recycled back to the column in order to achieve high carbon dioxide recovery from the inlet gas. This second separation on the overhead stream may be accomplished by physical or chemical solvents or by pressure swing adsorption (PSA). In particular, it is believed that use of a PSA provides some unique benefits in terms of capital and operating costs and plot space compared with a solvent separation.

Additionally, the remaining components of the column overhead stream may result in a stream that is enriched in hydrogen and can be used to generate power in a gas turbine and/or can be further purified in a second PSA unit to produce high-purity (>99.9 mol %) hydrogen product.

Therefore, the present invention may be characterized, in at least one aspect, as providing a process for producing a carbon dioxide stream by: separating, in a first separation zone, a feed stream comprising carbon dioxide and one or more additional components comprising hydrogen, nitrogen, carbon monoxide, methane, oxygen, argon, or mixtures thereof into a carbon dioxide enriched stream and a carbon dioxide depleted stream enriched in said one or more additional components; separating, in a second separation zone, the carbon dioxide depleted stream into a first stream comprising said one or more additional components and a second stream comprising at least 50% of the carbon dioxide in said carbon dioxide depleted stream; and, separating the second stream in the first separation zone.

The process may also include increasing the pressure of the second stream before separating the second stream in the first separation zone.

The feed stream may be dried prior to separating the feed stream in the first separation zone.

The feed stream may be an effluent from a gasification zone. The gasification zone may receive a fossil fuel as a feed, a biomass as a feed, or a combination thereof.

The second separation zone may be a pressure swing adsorption zone.

The second separation zone may be a solvent separation zone.

The process may include splitting the second stream into a first portion that is separated in the first separation zone and a second portion that comprises a product stream comprising gaseous carbon dioxide.

The feed stream may be at least 20 mol % carbon dioxide. Additionally, the feed stream may have a pressure of at least 25 bar(g).

In one or more aspects, the present invention may also broadly be characterized as providing a process for producing a stream comprising carbon dioxide by: passing a feed stream comprising carbon dioxide and one or more additional components comprising hydrogen, nitrogen, carbon monoxide, methane, oxygen, argon, or combinations thereof to a first separation zone configured to separate the feed stream into a carbon dioxide enriched stream and a carbon dioxide depleted stream enriched in said one or more additional components, wherein the first separation zone comprises a cryogenic fractionation column; recovering the carbon dioxide enriched stream from the first separation zone; passing the carbon dioxide depleted stream to a second separation zone configured to separate the carbon dioxide depleted stream into a first stream comprising said one or more additional components and a second stream comprising at least 50% of the carbon dioxide in said depleted stream; recovering the first stream from the second separation zone; and, passing the second stream to the first separation zone.

The feed stream may be at least 20 mol % carbon dioxide.
The feed stream may have a pressure of at least 25 bar(g).
The second separation zone may include a pressure swing adsorption zone, a solvent separation zone, or both.

The present invention, in one or more aspects, may be characterized, generally as providing an apparatus for producing a stream comprising carbon dioxide having: a first separation zone configured to receive a feed stream comprising carbon dioxide and one or more additional components comprising hydrogen, nitrogen, carbon monoxide, methane, oxygen, argon, or combinations thereof and separate the feed stream into a carbon dioxide enriched stream and a carbon dioxide depleted stream enriched in said one or more additional components, wherein the first separation zone includes a cryogenic fractionation column; a second separation zone configured to receive the carbon dioxide depleted stream and separate the carbon dioxide depleted stream into first stream comprising said one or more additional components and a second stream comprising at least 50% of the carbon dioxide in said depleted stream; and, one or more recycle lines configured to pass the second stream to the first separation zone.

The second separation zone may include a pressure swing adsorption zone, a solvent separation zone, or both.

The apparatus may also include a compressor, in a recycle line, configured to increase the pressure of the second stream.

The apparatus may also include a drying zone configured to dehydrate a stream and provide the feed stream to the first separation zone.

The apparatus may also include a gasification reactor configured to provide an effluent comprising carbon dioxide and at least one of hydrogen, nitrogen, carbon monoxide, methane, oxygen, and argon, wherein the feed stream may be at least a portion of the effluent of the gasification reactor; or a water-gas shift reactor configured to provide an effluent comprising carbon dioxide and at least one of hydrogen, nitrogen, carbon monoxide, methane, oxygen, and argon, wherein the feed stream may be at least a portion of the effluent of the water-gas shift reactor; or both.

Additional aspects, embodiments, and details of the invention, all of which may be combinable in any manner, are set forth in the following detailed description of the invention.

DETAILED DESCRIPTION OF THE DRAWINGS

Figure 2:
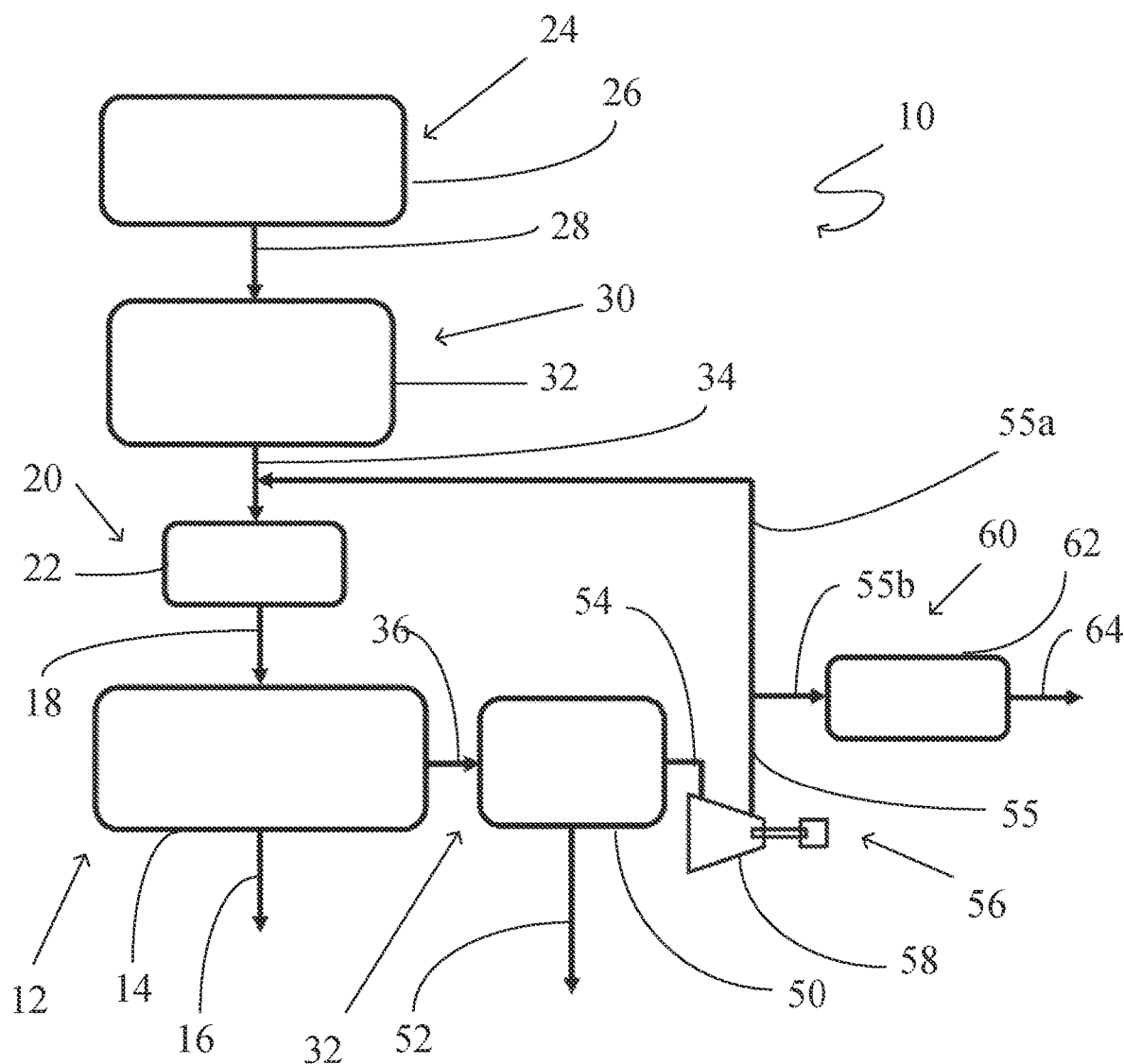

One or more exemplary embodiments of the present invention will be described below in conjunction with the following drawing figures, in which:

FIG. 1 shows a schematic diagram of an embodiment of the present invention; and, FIG. 2 shows a schematic diagram of another embodiment of the present invention.

DETAILED DESCRIPTION OF THE INVENTION

As mentioned above, the present invention provides for the effective and efficient production of high-purity carbon dioxide by using a carbon dioxide separation process, for example with a distillation column. A vapor stream from the carbon dioxide separation process contains significant carbon dioxide and is subjected to a second separation process with either a PSA unit or a solvent separation unit. The solvent separation unit may utilize chemical solvents or physical solvents. The second separation process also provides a hydrogen containing stream that may be used as fuel gas or further refined to provide a high purity hydrogen stream.

With these general principles in mind, one or more embodiments of the present invention will be described with the understanding that the following description is not intended to be limiting.

As shown in FIGS. 1 and 2, one or more embodiments of the present invention are directed at an apparatus 10 that includes a separation zone 12 having, for example, a cryogenic fractionation column 14 which provides a stream 16 comprising liquid carbon dioxide. This stream 16 may be pumped to a high pressure (and will change from liquid phase to super-critical state) before it is recovered as a product stream. In either event, this stream 16 is a high purity carbon dioxide stream that is suitable for transport.

The cryogenic fractionation column 14 is a conventional distillation column containing a plurality of vertically spaced trays, one or more packed beds, or some combination of trays and packing. Although not depicted as such, the separation zone 12 also includes a heat exchanger for chilling the dried inlet gas, along with a source of refrigeration, which may be an external refrigeration package comprising a mixed refrigerant.

Also associated with the cryogenic fractionation column 14, as is known, are reboilers (such as a bottom reboiler and a side reboiler) which heat and vaporize a portion of the liquids flowing down the column to provide the stripping vapors which flow up the column to strip the liquids flowing down. In addition to reboilers, other heat exchangers may be utilized to transfer heat to/from the liquid and gas in the column 14. The trays and/or packing provide the necessary contact between the stripping vapors rising upward and cold liquid falling downward, so that the column bottom liquid product stream exits the bottom of the tower, based on reducing the hydrogen and lighter component concentration in the bottom product to make a very pure carbon dioxide product.

It is also contemplated that the first separation zone 12 may instead or also include a single or multiple successive flash vapor-liquid separation vessels with each separator providing an additional theoretical stage of mass transfer, with the stream 16 comprising liquid carbon dioxide and lighter components (hydrogen, methane, nitrogen, etc.) being recovered in an overhead vapor stream(s). Accordingly, while the remaining description focuses on the depicted first separation zone 12 having a cryogenic fractionation column 14, this is merely preferred.

A feed stream 18 to the first separation zone 12 is a gaseous stream including carbon dioxide and one or more of hydrogen, nitrogen, carbon monoxide, methane, oxygen, argon, or mixtures thereof. The feed stream 18 may also contain water. Prior to being passed to the first separation zone 12, the feed stream 18 may be passed to a drying zone 20 having a dryer 22. As is known, the dryer 22 dehydrates the feed stream 18 to prevent hydrate (ice) formation under cryogenic conditions in the fractionation column 14. Solid and liquid desiccants have both been used for this purpose.

The feed stream 18 to the first separation zone 12 comprises at least 20 mol % carbon dioxide, preferably at least 30 mol % carbon dioxide, and most preferably at least 40 mol % carbon dioxide. Additionally, the feed stream has a pressure that is between 25 bar(g) to 65 bar(g), preferably 30 bar(g) to 50 bar(g). One suitable source for such a feed stream is a gasification zone 24; however, other possible sources include compressed PSA tail gas from a new or existing steam reforming unit with an optional gas heated reformer, compressed PSA tail gas from an autothermal reforming unit with an optional gas heated reformer, or a partial oxidation (POX) unit. Accordingly, while the following description is directed at the gasification zone 24, any process that produces an effluent which comprises a mixture of gases comprising carbon dioxide, hydrogen, water, and at least one of methane, carbon monoxide, nitrogen, and argon may be used with the present processes.

As is known a gasification zone 24, includes a gasification reactor 26, or gasifier, which receives a carbon containing feed material and, at elevated temperatures in the presence of oxygen and/or steam, breaks down the carbon material and provides an effluent 28 that is a gaseous mixture of hydrogen, carbon monoxide, methane, carbon dioxide, water, traces of argon and possibly nitrogen. The carbon containing feed material for the gasification zone 24 may be a fossil fuel, a biomass, or a combination thereof.

In order to remove some of the carbon monoxide and to increase the hydrogen, the effluent 28 from the gasification reactor 26 may be passed to a water-gas shift reaction zone 30 having a reactor 32 operated under conditions in which carbon monoxide and water react to form carbon dioxide and hydrogen. An effluent 34 from the water-gas shift reaction zone 30 includes hydrogen, carbon dioxide, water, methane, traces of argon, possibly nitrogen, and un-reacted carbon monoxide.

The utilization of the gasification zone 24 and/or the water-gas shift reaction zone 30 to provide the feed stream 18 is merely exemplary and other sources of suitable carbon dioxide streams may be used to provide the feed stream 18 to the first separation zone 12. For example, flue gases, steel plant (blast furnace) off gas, or lime/cement kiln off gas are believed to be suitable sources.

As noted above, the operating conditions of the cryogenic fractionation column 14 are limited by the triple point of carbon dioxide. Accordingly, while the stream 16 has a high purity, a significant amount of carbon dioxide slips into a depleted carbon dioxide vapor stream 36 from the cryogenic fractionation column 14. Compared with the feed stream 18, the depleted carbon dioxide vapor stream 36 has a lower amount of carbon dioxide relative to the other components of the stream and the stream 36 is enriched in the additional components.

With reference to FIG. 1, according to various embodiments, the depleted carbon dioxide vapor stream 36 is passed to a second separation zone 38 having a pressure swing adsorption (PSA) unit 40. As is known, the PSA unit 40 generally includes four or more adsorption vessels, and each vessel includes a plurality of adsorbent layers.

In the pressure swing adsorption unit 40, a multicomponent gas, in this case, the depleted carbon dioxide vapor stream 36, is typically fed to at least one of a plurality of adsorption beds at an elevated pressure effective to adsorb at least one component, while at least one other component passes through. At a defined time, feed to the adsorber is terminated and the bed is depressurized by one or more co-current depressurization steps wherein pressure is reduced to a defined level which permits the separated, less-strongly adsorbed component or components remaining in the bed to be drawn off without significant concentration of the more-strongly adsorbed components. Then, the bed is depressurized by a countercurrent depressurization step wherein the pressure on the bed is further reduced by withdrawing desorbed gas counter-currently to the direction of feed. Finally, the bed is purged and repressurized. The final stage of re-pressurization is with product gas or feed gas.

In the present processes, the PSA unit 40 produces a first stream 42 including the additional components of hydrogen, nitrogen, carbon monoxide, methane, oxygen, argon, and mixtures thereof. Relative to the depleted carbon dioxide vapor stream 36, the first stream 42 from the PSA unit 40 is rich in hydrogen. This first stream 42 could be used as fuel gas in, for example, a gas turbine. Alternatively, a second PSA unit could be utilized to further refine the first stream 42 and provide a high purity hydrogen stream.

Returning to the PSA unit 40, a second stream 44 from the PSA unit 40 includes at least 50%, or at least 70%, or at least 90%, or at least 95% of the carbon dioxide in the depleted carbon dioxide vapor stream 36. The second stream 44 may be passed to a compression zone 46 including a compressor 48 to increase the pressure of the second stream 44 and provide a high pressure second stream 45 that is recycled to the first separation zone 12 to be separated therein. For example, the second stream 44 (or high pressure second stream 45) may be combined with the feed stream 18, downstream of the drying zone 20.

Turning to FIG. 2, in some embodiments of the present invention, instead of a PSA unit, the second separation zone 38 includes a solvent separation unit 50. As is known the solvent separation unit 50 includes one or more vessels and captures species from a multicomponent stream with either chemical solvents, such as alkanolamines or alkali metal salts, or physical solvents, such as a dimethylether of polyethylene glycol.

In the present processes, the solvent separation unit 50, produces a first stream 52 including hydrogen, nitrogen, carbon monoxide, methane, oxygen, argon, water, and mixtures thereof. Relative to the depleted carbon dioxide vapor stream 36, the first stream from the solvent separation unit 50 is also rich in hydrogen. This first stream 52 could be used as fuel gas in, for example, a gas turbine. As with the previous embodiments, a PSA unit could be utilized to further refine the first stream 52 and provide a high purity hydrogen stream.

Returning to the solvent separation unit 50, a second stream 54 from the solvent separation unit 50 includes at least 50%, or at least 70%, or at least 90%, or at least 95% of the carbon dioxide in the depleted carbon dioxide vapor stream 36. The second stream 54 may be passed to a compression zone 56 including a compressor 58 to increase the pressure of the second stream 54 and provide a high pressure second stream 55 that is recycled to the first separation zone 12 to be separated therein. For example, the second stream 54 (or the high pressure second stream 55) may be combined with the feed stream 18, upstream of the drying zone 20 so that water from the second stream 54 (or the high pressure second stream 55) may be removed.

Additionally, it is contemplated that the high pressure second stream 55 (or second stream 54) is split—with only a portion 55a of the high pressure second stream 55 returning to the first separation zone 12. A second portion 55b of the high pressure second stream 55 may be passed to a second drying zone 60 having a dryer 62.

An effluent stream 64 from the dryer 62 is a high purity carbon dioxide gaseous stream that is suitable for transport as a vapor stream. The ratio of first portion 55a to second portion 55b may range from 100%:0% to 0%:100%, inclusive of any ratio therebetween.

EXAMPLES

Table 1, below, depicts characteristics of a feed stream that may be used in one or more embodiments of the present application.

TABLE 1

| | |
|---|---|
| Flow kgmol/hr | 12,560 |
| Pressure, bar(g) | 43.6 |
| Temperature, ° C. | 40 |
| Composition, mol % | |
| Hydrogen | 55.5 |
| Carbon Dioxide | 41.2 |
| Carbon Monoxide | 1.0 |
| Methane | 0.3 |
| Nitrogen | 1.3 |
| Water | 0.2 |
| Argon | 0.5 |

The feed stream is a syngas stream from a petroleum coke gasification process that has also been subjected to a water-gas shift reaction.

A computer simulation of the process shown in FIG. 1 and FIG. 2 was performed with the inlet gas condition shown in TABLE 1. A comparison of these results for a solvent separation zone (using an amine absorber) and a PSA separation zone is given in TABLE 2 below. For the same carbon dioxide product purity and carbon dioxide product recovery from the inlet gas, at equivalent carbon dioxide delivery pressure, the PSA separation zone provides an unexpected benefit compared to the amine absorber in terms of equipment and operating costs. This result is surprising since the high-pressure product gas (hydrogen, carbon monoxide, methane, nitrogen, and argon) recovery is lower in the PSA unit compared to the amine unit, leading to a higher tail gas recycle flow through the gas compressor to the first separation zone.

TABLE 2

| | Amine Unit | PSA |
|---|---|---|
| $CO_2$ Recovery, % | 99.8 | 99.8 |
| $CO_2$ Purity, mol % | >99.0 | >99.0 |
| $CO_2$ Delivery Pressure, bar(g) | 138 | 138 |
| Equipment Cost | 1.0 | 0.84 |
| Electricity | 1.0 | 1.04 |
| Fuel Gas (Steam) | 1.0 | 0.0 |
| Total OPEX | 1.0 | 0.87 |

Further computer simulations were conducted in order to optimize the process using the PSA separation zone. These results are summarized in TABLE 3. For comparison, Case 1 shows the absence of the PSA separation zone, where it can be seen that the overall carbon dioxide recovery from the inlet gas is only 74%. Adding the PSA separation zone increases the overall carbon dioxide recovery to 99.8%. Furthermore, the specific compression power of the process (kW*hr per metric ton of carbon dioxide product) is about the same or somewhat lower than the case without a PSA separation zone. Finally, another surprising result is that operating the PSA separation zone with a higher tail gas pressure (Case 3 in TABLE 3) results in a lower specific power.

TABLE 3

| | Case 1. No PSA | Case 2. PSA | Case 3. PSA |
|---|---|---|---|
| PSA Tail Gas Pressure, bar(g) | — | 0.35 | 1.25 |
| Net $CO_2$ Recovery from Inlet Gas, % | 74 | 99.8 | 99.8 |
| Total Power, kW hr/MT $CO_2$ | 154 | 155 | 150 |

TABLES 4-8, below, provide computer simulation results for a PSA system separating a feed stream into a first stream comprising hydrogen, carbon monoxide, methane, and nitrogen, and a second stream comprising at least 50% of the carbon dioxide in said stream. The feed stream is believed to be characteristic of a carbon dioxide depleted stream provided by a cryogenic fractionation column.

TABLE 4 shows a 6-bed cycle with 3 pressure equalization steps for the PSA unit. It is an abbreviated form of the overall PSA cycle (called a sub-cycle) and are routinely used by practitioners to capture the minimum amount of required information to represent the complete multi-bed PSA cycle. These sub-cycles are replicated according to known procedures (with each row corresponding to one bed) in order produce complete cycle charts. It is understood that other variations of cycle details are possible. TABLE 5 provides a detailed description of the 6-bed sub-cycle in TABLE 4.

These cycles were used in the computer simulation to provide the results for the PSA unit shown in TABLES 6-8.

TABLE 4

| ADS | |
|---|---|
| EQ1D | EQ2D |
| EQ3D | PP |
| BD | PURGE |
| EQ3U | EQ2U |
| EQ1U | FREP |

TABLE 5

| Step | Abbreviation | Flow Direction | Time* | Starting Pressure, kPa | Ending Pressure, kPa |
|---|---|---|---|---|---|
| Adsorption | ADS | Up | X | 4400 | 4400 |
| Equalization 1 | EQ1D | Up | 0.3x | 4400 | 2930 |
| Equalization 2 | EQ2D | Up | 0.7x | 2930 | 1740 |
| Equalization 3 | EQ3D | Up | 0.3x | 1740 | 990 |
| Provide Purge | PP | Up | 0.7x | 990 | 320 |
| Blowdown | BD | Down | 0.3x | 320 | 170 |
| Purge | PURGE | Down | 0.7x | 170 | 170 |
| Equalization 3 | EQ3U | Down | 0.3x | 170 | 750 |
| Equalization 2 | EQ2U | Down | 0.7x | 750 | 1740 |
| Equalization 1 | EQ1U | Down | 0.3x | 1740 | 2930 |
| Feed Repressurization | FREP | Up | 0.7x | 2930 | 4400 |

*x = sub-cycle time (ranges from 50 to 150 sec)

A computer simulation was run for the PSA unit using the cycle shown in TABLES 4 and 5. The feed stream composition is shown in TABLE 6 and the bed loading is given in TABLE 7. As can be seen in TABLE 8, the first gas stream from the PSA unit contains over 93% of the hydrogen in the feed stream, along with about 75% of the CO, over 65% of the $CH_4$, about 85% of the nitrogen, and only 0.4% of the $CO_2$. The second stream contains 99.6% of the $CO_2$ from the feed stream and only 6.7% of the hydrogen in the feed stream. Thus, the second stream may be passed back to the cryogenic fractionation column to capture the $CO_2$ from the carbon dioxide depleted stream that is provided by the cryogenic fractionation column.

TABLE 6

| | Feed Gas, Mol % |
|---|---|
| Hydrogen | 42 |
| Carbon Monoxide | 15 |
| Methane | 24 |
| Carbon Dioxide | 18 |
| Nitrogen | 1 |

Pressure: 4400 kPa
Temperature: 40° C.

TABLE 7

| | Bed Loading, Vol % |
|---|---|
| NaY Zeolite | 20 |
| Silica Gel (bottom) | 80 |

TABLE 8

| | % Recovery from Feed | | |
|---|---|---|---|
| | Product | Tail Gas | Total |
| Hydrogen | 93.3 | 6.7 | 100.0 |
| Carbon Monoxide | 75.7 | 24.3 | 100.0 |
| Methane | 67.7 | 32.3 | 100.0 |
| Carbon Dioxide | 0.4 | 99.6 | 100.0 |
| Nitrogen | 84.8 | 15.2 | 100.0 |

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for producing a carbon dioxide stream, the process comprising separating, in a first separation zone, a feed stream comprising carbon dioxide and one or more additional components comprising hydrogen, nitrogen, carbon monoxide, methane, oxygen, argon, or mixtures thereof into a carbon dioxide enriched stream and a carbon dioxide depleted stream enriched in the one or more additional components; separating, in a second separation zone, the carbon dioxide depleted stream into a first stream comprising the one or more additional components and a second stream comprising at least 50% of the carbon dioxide in the carbon dioxide depleted stream; and, separating the second stream in the first separation zone. An embodiment of the invention is one, any or all of prior embodiments in this paragraph up through the first embodiment in this paragraph, further comprising increasing the pressure of the second stream before separating the second stream in the first separation zone. An embodiment of the invention is one, any or all of prior embodiments in this paragraph up through the first embodiment in this paragraph, wherein the feed stream is dried prior to separating the feed stream in the first separation zone. An embodiment of the invention is one, any or all of prior embodiments in this paragraph up through the first embodiment in this paragraph, wherein the feed stream comprises an effluent from a gasification zone. An embodiment of the invention is one, any or all of prior embodiments in this paragraph up through the first embodiment in this paragraph, wherein the gasification zone receives a fossil fuel as a feed. An embodiment of the invention is one, any or all of prior embodiments in this paragraph up through the first embodiment in this paragraph, wherein the gasification zone receives a biomass as a feed. An embodiment of the invention is one, any or all of prior embodiments in this paragraph up through the first embodiment in this paragraph, wherein the second separation zone comprises a pressure swing adsorption zone. An embodiment of the invention is one, any or all of prior embodiments in this paragraph up through the first embodiment in this paragraph, wherein the second separation zone comprises a solvent separation zone. An embodiment of the invention is one, any or all of prior embodiments in this paragraph up through the first embodiment in this paragraph, further comprising splitting the second stream into a first portion that is separated in the first separation zone, and a second portion that comprises a product stream comprising gaseous carbon dioxide. An embodiment of the invention is one, any or all of prior embodiments in this paragraph up through the first embodiment in this paragraph, wherein the feed stream comprises at least 20 mol % carbon dioxide. An embodiment of the invention is one, any or all of prior embodiments in this paragraph up through the first embodiment in this paragraph, wherein the feed stream comprises a pressure of at least 25 bar(g).

A second embodiment of the invention is a process for producing a stream comprising carbon dioxide, the process comprising passing a feed stream comprising carbon dioxide and one or more additional components comprising hydrogen, nitrogen, carbon monoxide, methane, oxygen, argon, or combinations thereof to a first separation zone configured to separate the feed stream into a carbon dioxide enriched stream and a carbon dioxide depleted stream enriched in the one or more additional components, wherein the first separation zone comprises a cryogenic fractionation column; recovering the carbon dioxide enriched stream from the first separation zone; passing the carbon dioxide depleted stream to a second separation zone configured to separate the carbon dioxide depleted stream into a first stream comprising the one or more additional components and a second stream comprising at least 50% of the carbon dioxide in the carbon dioxide depleted stream; recovering the first stream from the second separation zone; and, passing the second stream to the first separation zone. An embodiment of the invention is one, any or all of prior embodiments in this paragraph up through the second embodiment in this paragraph, wherein the feed stream comprises at least 20 mol % carbon dioxide. An embodiment of the invention is one, any or all of prior embodiments in this paragraph up through the second embodiment in this paragraph, wherein the feed stream comprises a pressure of at least 25 bar(g). An embodiment of the invention is one, any or all of prior embodiments in this paragraph up through the second embodiment in this paragraph, wherein the second separation zone comprises a pressure swing adsorption zone, a solvent separation zone, or both.

A third embodiment of the invention is an apparatus for producing a stream comprising carbon dioxide, the apparatus comprising a first separation zone configured to receive a feed stream comprising carbon dioxide and one or more additional components comprising hydrogen, nitrogen, carbon monoxide, methane, oxygen, argon, or combinations thereof and separate the feed stream into a carbon dioxide enriched stream and a carbon dioxide depleted stream enriched in the one or more additional components, wherein the first separation zone comprises a cryogenic fractionation column; a second separation zone configured to receive the carbon dioxide depleted stream and separate the carbon dioxide depleted stream into first stream comprising the one or more additional components and a second stream comprising at least 50% of the carbon dioxide in the carbon dioxide depleted stream; and, one or more recycle lines configured to pass the second stream to the first separation zone. An embodiment of the invention is one, any or all of prior embodiments in this paragraph up through the third embodiment in this paragraph, wherein the second separation zone comprises a pressure swing adsorption zone, a solvent separation zone, or both. An embodiment of the invention is one, any or all of prior embodiments in this paragraph up through the third embodiment in this paragraph further comprising a compressor, in a recycle line, configured to increase the pressure of the second stream. An embodiment of the invention is one, any or all of prior embodiments in this paragraph up through the third embodiment in this paragraph further comprising a drying zone configured to dehydrate a stream and provide the feed stream to the first separation zone. An embodiment of the invention is one, any or all of prior embodiments in this paragraph up through the third embodiment in this paragraph, further comprising a gasification reactor configured to provide an effluent comprising carbon dioxide and at least one of hydrogen, nitrogen, carbon monoxide, methane, oxygen, and argon, wherein the feed stream comprises at least a portion of the effluent of the gasification reactor; or a water-gas shift reactor configured to provide an effluent comprising carbon dioxide and at least one of hydrogen, nitrogen, carbon monoxide, methane, oxygen, and argon, wherein the feed stream comprises at least a portion of the effluent of the water-gas shift reactor; or both.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by mole, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for producing a carbon dioxide stream, the process comprising:
   separating, in a first separation zone, a feed stream comprising carbon dioxide and one or more additional components comprising hydrogen, nitrogen, carbon monoxide, methane, oxygen, argon, or mixtures thereof into a carbon dioxide enriched stream and a carbon dioxide depleted stream enriched in said one or more additional components;
   separating, in a second separation zone, the carbon dioxide depleted stream into a first stream comprising said one or more additional components and a second stream comprising at least 50% of the carbon dioxide in said carbon dioxide depleted stream;
   increasing a pressure of the second stream to provide a high pressure second stream, wherein the pressure is increased using a compressor;
   combining the high pressure second stream with the feed stream; and
   separating the high pressure second stream in the first separation zone.

2. The process of claim 1, wherein the feed stream is dried prior to separating the feed stream in the first separation zone.

3. The process of claim 1, wherein the feed stream comprises an effluent from a gasification zone.

4. The process of claim 3, wherein the gasification zone receives a fossil fuel as a feed.

5. The process of claim 3, wherein the gasification zone receives a biomass as a feed.

6. The process of claim 1, wherein the second separation zone comprises a pressure swing adsorption zone.

7. The process of claim 1, wherein the second separation zone comprises a solvent separation zone.

8. The process of claim 7, further comprising:
splitting the second stream into a first portion that is separated in the first separation zone, and a second portion that comprises a product stream comprising gaseous carbon dioxide.

9. The process of claim 1, wherein the feed stream comprises at least 20 mol % carbon dioxide.

10. The process of claim 9, wherein the feed stream comprises a pressure of at least 25 bar (g).

11. A process for producing a stream comprising carbon dioxide, the process comprising:
passing a feed stream, at a pressure of at least 25 bar (g), comprising carbon dioxide and one or more additional components comprising hydrogen, nitrogen, carbon monoxide, methane, oxygen, argon, or combinations thereof to a first separation zone configured to separate the feed stream into a carbon dioxide enriched stream and a carbon dioxide depleted stream enriched in said one or more additional components, wherein the first separation zone comprises a cryogenic fractionation column;
recovering the carbon dioxide enriched stream from the first separation zone;
passing the carbon dioxide depleted stream to a second separation zone
configured to separate the carbon dioxide depleted stream into a first stream comprising said one or more additional components and a second stream comprising at least 50% of the carbon dioxide in said carbon dioxide depleted stream;
recovering the first stream from the second separation zone;
increasing a pressure of the second stream to provide a high pressure second stream, wherein the pressure is increased using a compressor;
combining the high pressure second stream with the feed stream; and
passing the high pressure second stream to the first separation zone.

12. The process of claim 11, wherein the feed stream comprises at least 20 mol % carbon dioxide.

13. The process of claim 11, wherein the second separation zone comprises a pressure swing adsorption zone, a solvent separation zone, or both.

14. An apparatus for producing a stream comprising carbon dioxide, the apparatus comprising:
a first separation zone configured to receive a feed stream comprising carbon dioxide and one or more additional components comprising hydrogen, nitrogen, carbon monoxide, methane, oxygen, argon, or combinations thereof and separate the feed stream into a carbon dioxide enriched stream and a carbon dioxide depleted stream enriched in said one or more additional components, wherein the first separation zone comprises a cryogenic fractionation column;
a second separation zone configured to receive the carbon dioxide depleted stream and separate the carbon dioxide depleted stream into first stream comprising said one or more additional components and a second stream comprising at least 50% of the carbon dioxide in said depleted stream;
one or more recycle lines configured to pass the second stream to the first separation zone; and,
a compressor, in the one or more recycle lines, configured to increase a pressure of the second stream.

15. The apparatus of claim 14, wherein the second separation zone comprises a pressure swing adsorption zone, a solvent separation zone, or both.

16. The apparatus of claim 14 further comprising:
a drying zone configured to dehydrate a stream and provide the feed stream to the first separation zone.

17. The apparatus of claim 14, further comprising
a gasification reactor configured to provide an effluent comprising carbon dioxide and at least one of hydrogen, nitrogen, carbon monoxide, methane, oxygen, and argon, wherein the feed stream comprises at least a portion of the effluent of the gasification reactor; or
a water-gas shift reactor configured to provide an effluent comprising carbon dioxide and at least one of hydrogen, nitrogen, carbon monoxide, methane, oxygen, and argon, wherein the feed stream comprises at least a portion of the effluent of the water-gas shift reactor; or both.

* * * * *